United States Patent [19]

Kimura et al.

[11] 4,131,784
[45] Dec. 26, 1978

[54] COATED WELDING ELECTRODE CONTAINING CHROMIUM

[75] Inventors: Shinji Kimura, Kamakura; Tomokazu Godai, Fujisawa; Shoji Minato, Fujisawa; Minoru Kobayashi, Fujisawa; Makoto Yamaga, Fujisawa; Shingo Maki, Fujisawa; Yoshizo Hashimoto, Fujisawa; Tetsuo Suga, Fujisawa; Hiroshi Saita, Fujisawa, all of Japan

[73] Assignee: Kobe Steel, Ltd., Kobe, Japan

[21] Appl. No.: 780,495

[22] Filed: Mar. 23, 1977

[30] Foreign Application Priority Data

Mar. 23, 1976 [JP] Japan .................................. 51/32337

[51] Int. Cl.² .......................... B23K 9/24; B23K 35/00
[52] U.S. Cl. .............................. 219/137 WM; 148/23; 148/24; 148/26; 219/137 R; 428/385; 428/386; 428/387; 219/145.23

[58] Field of Search ....................... 428/385, 386, 387; 219/137 R, 146, 137 WM; 148/23, 24, 26

[56] References Cited

U.S. PATENT DOCUMENTS 3,472,686 10/1969 Hillert ............................. 428/385 X

*Primary Examiner*—Richard E. Schafer
*Attorney, Agent, or Firm*—Oblon, Fisher, Spivak, McClelland & Maier

[57] ABSTRACT

The present invention relates to a coated welding electrode containing at least 0.5% of Cr based on the total weight of the welding electrode and comprising a metal core and a coating flux composition. In this welding electrode, the content of Na and K components in the coating flux calculated as ($Na_2O$ + $K_2O$) is reduced below 1% based on the total weight of the coating flux composition, whereby amounts of fumes generated at the welding step, especially the amount of toxic soluble Cr, are suppressed and minimized.

8 Claims, 1 Drawing Figure

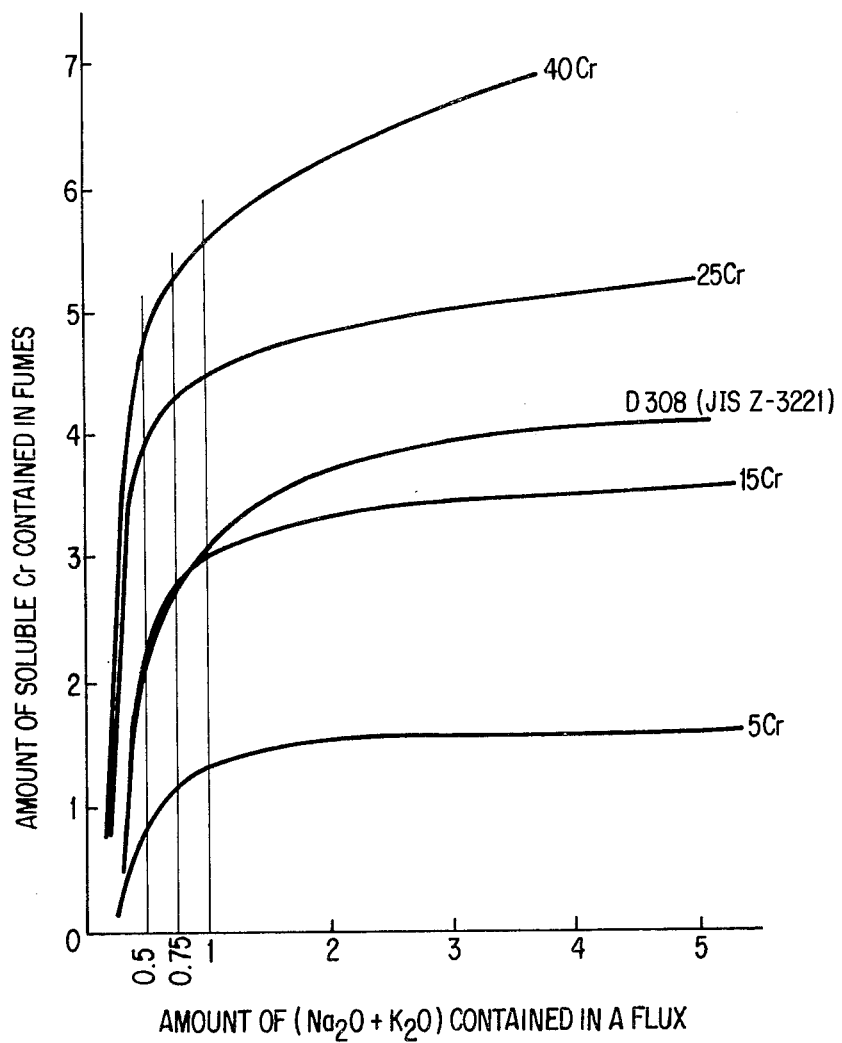

COATED WELDING ELECTRODE CONTAINING CHROMIUM

BACKGROUND OF THE INVENTION (1) Field of the Invention:

The present invention relates to a welding electrode and more particularly to a coated welding electrode containing chromium in which the content of $Na_2O$ and $K_2O$ acting as a binder for a coating flux composition is reduced to a low level, whereby amounts of fumes generated at the welding step, especially the amount of toxic soluble Cr contained in such fumes, are suppressed and minimized.

(2) Description of the Prior Art:

Japanese Patent Publication No. 20477/63 (to Kobe Steel Ltd.) discloses an attempt to reduce the toxicity of fumes generated at the welding step using a low hydrogen welding electrode by reducing the content of K based on the chemical causal relation between $CaF_2$ and K. This prior art reference, however, has no description about the chemical causal relation between Na and Cr.

U.S. Pat. No. 2,983,632 (to The British Oxygen Co. Ltd.) discloses a coated welding electrode of which a flux comprises titanium, lime stone, iron powder and a binder. It is indefinite whether or not Na and K are contained in the flux of this coated welding electrode, but as will be apparent from various literature references circulated at the time of filing of the above U.S. Patent, in welding electrodes proposed and manufactured in those days, at least 1% of sodium silicate ($Na_2SiO_3$) based on the total flux was ordinarily contained.

As the welding material in which the content of ($Na_2O$ + $K_2O$) is lower than 1% based on the flux, a flux cored electrode (compsite wire is disclosed in U.S. Pat. No. 3,531,620 (to Kobe Steel Ltd.). In this flux cored electrode, however, since the flux is supported by a metal hoop, it is unnecessary to apply the flux around the core by using a binder as in the case of a flux coated electrode. Accordingly, problems to be solved in a flux cored electrode as disclosed in the above U.S. patent are substantially different from problems to be solved in a flux coated electrode as intended in the present invention.

SUMMARY OF THE INVENTION

It is a primary object of the present invention to provide a chromium-containing coated welding electrode in which amounts of fumes generated at the welding step, especially toxic soluble Cr contained in said fumes, are suppressed and minimized.

In accordance with the first aspect of the present invention for attaining the foregoing and other objects, there is provided a chromium-containing coated welding electrode containing at least 0.5% of Cr based on the total weight of the welding electrode and comprising a metal core and a coating flux composition, wherein the content of Na and K components in the coating flux calculated as ($Na_2O$ + $K_2O$) is reduced below 1% based on the total weight of the coating flux.

In accordance with the second aspect of the present invention, there is provided a chromium-containing coated welding electrode as set forth in the first aspect wherein a colloidal solution in which a dispersed phase containing at least one member selected from the group consisting of oxides of Si, Al, Zr, B, P, Ti, Mg, Ca, Th and Fe occupies 1 to 90% by weight of the total solution is used as a binder of the coating flux.

BRIEF DESCRIPTION OF THE DRAWING:

FIG. 1 is a graph illustrating the relation between the amount of ($Na_2O$ + $K_2O$) contained in a flux and the amount of soluble Cr contained in fumes generated when welding is carried out by using a chromium-containing coated electrode.

DETAILED DESCRIPTION OF THE PREFERRED EMBODIMENTS

The present invention relates to a coated welding electrode comprising a metal core and a flux coated around the metal core and containing at least 0.5% of Cr based on the total weight of the welding electrode in at least one of the metal core and the flux coating.

Chromium-containing coated welding electrodes are now used for welding stainless steel materials of the Ni-Cr system and materials of the Cr-Mo system and as welding materials for hard facing.

Stainless steel materials are now used broadly in various industrial fields such as the fields of petrochemical industries, fiber industries and atomic power industries because stainless steels are excellent in corrosion resistance, oxidation resistance and heat resistance and have good processability and good mechanical properties, and it is expected that demands for these stainless steel materials will be increasing in the future. Accordingly, it also is expected that demands for welding materials for such stainless steel materials will be increasing.

Low alloy heat resistant steels and heat resistant alloys are used for high-temperature high-pressure operations conducted mainly in thermoelectric power plants and petrochemical industries. It is therefore expected that demands for materials of Cr-Mo system will be increasing in the future. Accordingly, it also is expected that welding materials for such materials of the Cr-Mo system will be increasing.

Further, welding materials for hard facing are now used in various fields for construction work, mining and agriculture, and it is expected that their application range will be expanded henceforth.

Chromium-containing welding materials are thus used in various industrial fields and their excellent properties are fully utilized. Fumes are inevitably generated from welding materials at the welding step, and as a result of analytical experiments made by us, it was found that so-called soluble Cr which is soluble in water and is now regarded as being toxic is contained at a concentration of several percent in fumes generated from chromium-containing welding materials. Various contrivances for removing fumes are now made at welding spots so as to improve the working environment, and although the working environment is fairly improved by these means for removing fumes from the welding spots, it is preferred to prevent beforehand generation of toxic substances such as soluble Cr.

Therefore, various experiments have been carried out with a view to clarifying why and how soluble Cr is contained in fumes from chromium-containing welding materials, and as a result of the X-ray diffraction analysis of such fumes it was confirmed that compounds of Cr with Na and K are contained in these fumes. Thus, we found that when Na or K is co-present with Cr in a welding material, soluble Cr is generated in fumes. For confirmation, the content of soluble Cr in fumes generated when welding was carried out by using a bare core containing 20% of Cr was analytically compared with the content of soluble Cr contained in fumes generated when welding was carried out by using an electrode formed by coating the above core with water glass [($Na_2O + K_2O$) content = 0.13%, $SiO_2$ content = 13%], and it was found that the soluble Cr content was below 0.01% in the former case while the soluble Cr content was as high as 2.75% in the latter case.

Based on these findings, we succeeded in reducing the soluble Cr content in fumes to a minimum level by reducing contents of Na and K as much as possible in a flux of a flux-coated, chromium-containing welding electrode.

Water glass containing at least one of $Na_2O$ and $K_2O$ is ordinarily used as a binder of a coating flux of a coated welding electrode, and slag-forming agents containing $Na_2O$ and $K_2O$ such as feldspar and mica are often used as are carbonates of Na and K.

As pointed out hereinbefore, the presence of Na and K components in the flux is a cause of generation of soluble Cr. However, since the Na or K component is effective as an arc stabilizer or as one component of a binder, it is preferred that Na and K components be present in small amounts. Therefore, it is necessary to clarify the relation between the content of Na and K components and the amount generated of soluble Cr. Accordingly, we made the following experiments.

EXPERIMENT 1

Various chromium-containing cores having a diameter of 5.0 mm and a length of 400 mm were coated with a flux comprising lime stone, rutile, fluorite, metallic Cr and feldspar by using a binder ($SiO_2$ content = 20%, $Na_2O$ content ≦ 0.35%) so that the diameter of the resulting coated electrode was 7.5 mm. Thus, chromium-containing test electrodes were prepared. The Cr contents in the core and flux of each electrode and the $Na_2O$ and $K_2O$ contents in the flux (inclusive of the binder) were as shown in Table 1. For each welding electrode, a welding test was carried out under the conditions indicated below, and the fumes were collected and analyzed according to the methods described below.

(1) Welding conditions:
170 A, 22 - 27 V, AC
(2) Base metal:
19 mm (thickness) × 75 mm (width) × 400 mm (length) (mild steel buttered with the test electrode)
(3) Method for collecting fumes:
Welding was carried out in an iron box opened in the lower portion and having a high volume air sampler in the upper portion, and the generated fumes were sucked into the high volume air sampler and collected on a filter paper. After completion of the welding, the filter paper was taken out and the residue was collected and analyzed. The filter paper used was as follows:
Material: glass fiber
Shape: 8 inches × 12 inches
Weight: about 4000 mg
(4) Analysis method:
Soluble Cr in fumes: atomic absorption method
$Na_2O$ and $K_2O$ in the flux: atomic absorption method
(5) Results:
Obtained results were as shown in Table 1 and FIG. 1.

Table 1

| System | Sample No. | Cr Content (wt. %) in core | Cr Content (wt. %) in Coated Electrode | $Na_2O + K_2O$) Content (wt. %) in Flux | Soluble Cr Content (wt. %) in Fumes |
| --- | --- | --- | --- | --- | --- |
| 5-Cr | 1 | 5.5 | 5 | 0.29 | 0.07 |
| 5-Cr | 2 | 5.5 | 5 | 0.55 | 1.11 |
| 5-Cr | 3 | 5.5 | 5 | 1.13 | 1.39 |
| 5-Cr | 4 | 5.5 | 5 | 1.81 | 1.40 |
| 5-Cr | 5 | 5.5 | 5 | 4.84 | 1.60 |
| 15-Cr | 1 | 19.0 | 15 | 0.31 | 0.25 |
| 15-Cr | 2 | 19.0 | 15 | 0.63 | 2.74 |
| 15-Cr | 3 | 19.0 | 15 | 1.16 | 2.97 |
| 15-Cr | 4 | 19.0 | 15 | 2.33 | 3.41 |
| 15-Cr | 5 | 19.0 | 15 | 4.73 | 3.55 |
| 25-Cr | 1 | 26.5 | 25 | 0.22 | 0.99 |
| 25-Cr | 2 | 26.5 | 25 | 0.50 | 4.08 |
| 25-Cr | 3 | 26.5 | 25 | 0.86 | 4.43 |
| 25-Cr | 4 | 26.5 | 25 | 1.20 | 4.49 |
| 25-Cr | 5 | 26.5 | 25 | 4.75 | 5.25 |
| 40-Cr | 1 | 26.5 | 40 | 0.21 | 1.20 |
| 40-Cr | 2 | 26.5 | 40 | 0.58 | 5.10 |
| 40-Cr | 3 | 26.5 | 40 | 0.89 | 5.48 |
| 40-Cr | 4 | 26.5 | 40 | 1.73 | 5.75 |
| 40-Cr | 5 | 26.5 | 40 | 3.10 | 6.74 |

In Table 1, each value of the ($Na_2O + K_2O$) content is a value of the total content of ($Na_2O + K_2O$) in the coating flux inclusive of the binder. This content was adjusted by controlling the amount of added feldspar.

EXPERIMENT 2

Cores having a diameter of 4.0 mm and a length of 350 mm were coated with a flux indicated in Table 2 by using a binder ($SiO_2$ content = 20%, $Na_2O$ content ≦ 0.35%) to prepare coated electrodes for stainless steel D308 according to JIS Z-3221. The welding test was carried out as described below.

(1) Welding conditions:
140 A, 20 - 25 V, AC
(2) Base metal:
19 mm (thickness) × 75 mm (width) × 400 mm (length) (formed by buttering mild steel with D308)
(3) Methods for collecting and analyzing fumes:
Same as described in Experiment 1
(4) Results:
Obtained results were as shown in Table 3 and FIG. 1.

Table 2

| | Flux Composition (parts by weight) | | | | | | |
| --- | --- | --- | --- | --- | --- | --- | --- |
| Sample No. | lime stone | fluo-rite | ru-tile | metal-lic Cr | electro-lytic Mn | mica | Binder (cc per 100 g of solvent) |
| 1 | 20 | 5 | 48 | 7.5 | 5 | — | 15.5 |
| 2 | 20 | 5 | 48 | 7.7 | 5 | 3 | 16.0 |
| 3 | 20 | 5 | 48 | 8.2 | 5 | 10 | 18.3 |
| 4 | 20 | 5 | 48 | 9 | 5 | 20 | 18.4 |
| 5 | 20 | 5 | 48 | 10.5 | 5 | 35 | 17.0 |

Table 3

| Sample No. | Cr Content wt. %) in Entire Welding Electrode | ($Na_2O + K_2O$) Content (wt, %) in Flux | Soluble Cr Content (wt, %) in Fumes |
| --- | --- | --- | --- |
| 1 | 16 | 0.28 | 0.07 |
| 2 | 16 | 0.58 | 2.22 |
| 3 | 16 | 1.18 | 3.00 |
| 4 | 16 | 2.00 | 3.75 |
| 5 | 16 | 3.08 | 3.91 |

As will be apparent from the results shown in Tables 1 and 3 and FIG. 1, when the content of ($Na_2O + K_2O$) in the flux is lower than 1%, the amount of soluble Cr in fumes is abruptly decreased. When the content of ($Na_2O + K_2O$) is higher than 1%, there is observed a tendency for the amount of soluble Cr to decrease with decrease of the content of ($Na_2O + K_2O$), but this decrease is not conspicuous. This soluble Cr reducing effect is more conspicuous in a lower Cr system, but it is commonly attained in all the systems ranging from the 5-Cr system to the 40-Cr system. Accordingly, it will readily be understood that if the content of $Na_2O + K_2O$) is reduced below 1%, the soluble Cr content in fumes can be remarkably reduced. Further, it will be apparent that even if the content of ($Na_2O + K_2O$) is lower than 1%, the gradient of each curve greatly changes below the boundary value of 0.75%. Accordingly, it is apparently preferred that the content of ($Na_2O + K_2O$) be reduced below 0.75%.

Moreover, in the region where the content of ($Na_2O + K_2O$) is lower than 0.5%, each curve precipitously approaches zero. Thus, it is seen that if the content of ($Na_2O + K_2O$) is reduced below 0.5%, the amount of soluble Cr in fumes can be drastically reduced. It is most preferred that the content of ($Na_2O + K_2O$) be reduced substantially to zero. In this case, water glass having a much reduced ($Na_2O + K_2O$) content is used as the binder or other appropriate binder is used, and feldspar or the like containing $Na_2O$ and $K_2O$ is not added but silica sand is used as the $SiO_2$ source.

As a binder suitable for the coated welding electrode for attaining the above most preferred feature, there can be mentioned a colloidal solution comprising a dispersed phase such as at least one metal oxide selected from the group consisting of Si, Al, Zr, B, P Ti, Mg, Ca, Th and Fe, a dispersion medium such as water or an organic solvent, and a stabilizer such as alkali metal compound, an ammonium compound, an amine, and organic acid and an inorganic acid or a combination of the foregoing. Specifically, said colloidal solution can contain lithium silicate, amine silicate, colloidal silica and alumina sol. The above mentioned metal oxide dispersed phases may be used singly or in the form of a mixture of two or more of them. If the amount of the dispersed phase is smaller than 1% based on the total weight of the binder, the binding effect is insufficient, and if the amount of the dispersed phase is larger than 90% an the total weight of the binder, the fluidity or stability of the binder is degraded, gelation readily takes place and the coating property of the binder is reduced. Moreover, strain is readily caused in the coating at the drying step. The kind of dispersion medium that can be used for formation of the above colloidal solution in the present invention is not particularly critical, but water or an organic solvent is optionally chosen and used.

In welding electrodes used for the above-mentioned experiments, the arc did not become unstable at all since compounds having an arc-stabilizing activity, such as carbonates, fluorides and titanium oxide were included, even though the amounts of $Na_2O$ and $K_2O$ were very small. In view of the foregoing, it is seen that even in the case where $Na_2O$ and $K_2O$ have to be incorporated as arc stabilizers in the Cr-containing welding electrode of the present invention, their content must be reduced below 1%, and that in the case where other arc-stabilizing substances can be used, the content of $Na_2O$ and $K_2O$ is preferably reduced to zero or at least below 0.5%.

As will be apparent from the foregoing illustration, according to the present invention, by controlling the co-presence relation between Cr and the Na and K components under certain conditions, the amount of soluble Cr generated in fumes can be drastically reduced. Therefore, even at a welding spot where provision of a fume exhaust treatment apparatus is not allowed, the problem of operation safety can be solved, and when such fume exhaust treatment apparatus is used, disposal of the collected fumes will not cause any trouble. Therefore, the present invention makes great contributions to the improvement of the working environment.

What is claimed as new and desired to be secured by letters patent of the United States is:

1. A chromium-containing coated welding electrode, characterized in that the amounts of fumes generated at the welding step, especially the amount of toxic soluble Cr, are suppressed and minimized, comprising a metal core and a coating flux composition, and containing at least 0.5% of metallic Cr based on the total weight of said welding electrode and less than 1% of Na and K calculated as ($Na_2O + K_2O$) based on the total weight of said coating flux composition.

2. A chromium-containing coated welding electrode, characterized in that the amounts of fumes generated at the welding step, especially the amount of toxic soluble Cr, are suppressed and minimized, comprising a metal core and a coating flux composition and containing at least 0.5% of metallic chromium based on the total weight of said welding electrode in at least one of said metal core and said coating flux composition, wherein said coating flux composition contains less than 1% of Na and K calculated as ($Na_2O + K_2O$) based on the total weight of said coating flux composition, and wherein said coating flux composition is formed using a colloidal solution in which a dispersed phase containing at least one member selected from the group consisting of oxides of Si, Al, Zr, B, P, Ti, Mg, Ca, Th and Fe occupies 1 to 90% by weight of the total solution as a binder, and application of the coating is followed by a drying step to form said coating flux composition.

3. The chromium-containing coated welding electrode of claim 1 wherein the content of Na and K components in said coating flux composition calculated as ($Na_2O + K_2O$) is less than 0.75% based on the total weight of the coating flux.

4. The chromium-containing coated welding electrode of claim 1 wherein the content of Na and K components in said coating flux composition calculated as ($Na_2O + K_2O$) is less than 0.5% based on the total weight of the coating flux.

5. A method for suppressing and minimizing the amount of toxic soluble Cr in fumes generated at the welding step attendant upon the use of a chromium-containing coated welding electrode which comprises using the electrode of claim 1 as said chromium-containing coated welding electrode in said welding step.

6. The chromium-containing coated welding electrode of claim 2, wherein said colloidal solution used as a binder to form said coating flux composition further contains a dispersion medium selected from the group consisting of water and an organic solvent, and a stabilizer selected from the group consisting of an alkali metal compound, an ammonium compound, an amine, an organic acid and an inorganic acid, and wherein said colloidal solution further comprises at least one of lithium silicate, amine silicate, colloidal silica and alumina sol.

7. The chromium-containing welding electrode of claim 2, wherein the content of Na and K components in said coating flux composition calculated as ($Na_2O$ + $K_2O$) is less than 0.75% based on the total weight of the coating flux.

8. The chromium-containing coated welding electrode of claim 2, wherein the content of Na and K components in said coating flux composition calculated as ($Na_2O$ + $K_2O$) is less than 0.5% based on the total weight of the coating flux.

* * * * *